US008461529B2

(12) United States Patent
Hunter

(10) Patent No.: US 8,461,529 B2
(45) Date of Patent: Jun. 11, 2013

(54) VARIABLE WAVEBAND INFRARED IMAGER

(75) Inventor: Scott R. Hunter, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 407 days.

(21) Appl. No.: 12/889,149

(22) Filed: Sep. 23, 2010

(65) Prior Publication Data
US 2012/0074321 A1  Mar. 29, 2012

(51) Int. Cl.
 *H01L 49/00* (2006.01)
(52) U.S. Cl.
 USPC .......................................................... 250/330
(58) Field of Classification Search
 USPC ................................................. 250/330, 332
 See application file for complete search history.

(56) References Cited

U.S. PATENT DOCUMENTS

| | | | |
|---|---|---|---|
| 5,319,491 A * | 6/1994 | Selbrede | 359/291 |
| 5,737,086 A | 4/1998 | Gerber et al. | |
| 6,140,646 A | 10/2000 | Busta et al. | |
| 6,392,233 B1 | 5/2002 | Channin et al. | |
| 6,539,156 B1 | 3/2003 | Dickson et al. | |
| 6,999,221 B1 | 2/2006 | Sarkisov et al. | |
| 7,580,175 B2 | 8/2009 | Aksyuk et al. | |
| 2007/0241635 A1 | 10/2007 | Hunter et al. | |
| 2008/0122453 A1 | 5/2008 | Hunter | |
| 2008/0230698 A1 | 9/2008 | Simelgor et al. | |
| 2008/0230699 A1 | 9/2008 | Simelgor et al. | |
| 2009/0238236 A1 | 9/2009 | Fleury-Frenette et al. | |

OTHER PUBLICATIONS

S. R. Hunter, et al., High Sensitivity Uncooled Microcantilever Infrared Imaging Arrays in *Infrared Technology and Applications XXXII*, edited by F. A. Bjorn, F. F. Gabor and R. N. Paul. SPIE vol. 6206 (2006) pp. 6206IJ-1 to 62061J-12.
S. R. Hunter, et al., High sensitivity 25μm and 50μm pitch microcantilever IR imaging arrays in *Infrared Technology and Applications XXXIII*, edited by F. A. Bjorn, F. F. Gabor and R. N. Paul. SPIE vol. 6542 (2007) pp. 65421F-1 to 65421F-13.
S. R. Hunter, et al., Development and optimization of microcantilever based IR imaging arrays in *Infrared Technology and Applications XXXIV*, edited by F. A. Bjorn, F. F. Gabor and R. N. Paul. SPIE vol. 6940 (2008) pp. 694013-1 to 694013-12.
C. Minassian, et al., Uncooled amorphous silicon TEC-less ¼ VGA IRFPA with 25 μm pixel-pitch for high volume applications in *Infrared Technology and Applications XXXIV*, edited by F. A. Bjorn, F. F. Gabor and R. N. Paul, SPIE vol. 6940 (2008) pp. 69401Z-1 to 69401Z-8.

(Continued)

*Primary Examiner* — Constantine Hannaher
(74) *Attorney, Agent, or Firm* — Brinks, Hofer, Gilson & Lione

(57) ABSTRACT

A waveband imager includes an imaging pixel that utilizes photon tunneling with a thermally actuated bimorph structure to convert infrared radiation to visible radiation. Infrared radiation passes through a transparent substrate and is absorbed by a bimorph structure formed with a pixel plate. The absorption generates heat which deflects the bimorph structure and pixel plate towards the substrate and into an evanescent electric field generated by light propagating through the substrate. Penetration of the bimorph structure and pixel plate into the evanescent electric field allows a portion of the visible wavelengths propagating through the substrate to tunnel through the substrate, bimorph structure, and/or pixel plate as visible radiation that is proportional to the intensity of the incident infrared radiation. This converted visible radiation may be superimposed over visible wavelengths passed through the imaging pixel.

26 Claims, 7 Drawing Sheets

OTHER PUBLICATIONS

C. Li, et al., Recent Development of Ultra Small Pixel Uncooled Focal Plane Arrays at DRS in *Infrared Technology and Applications XXXIII*, edited by F. A. Bjorn, F. F. Gabor and R. N. Paul, SPIE vol. 6542 (2007) pp. 65421Y-1 to 65421Y-12.

U. Mizrahi, et al., New features and development directions in SCD's μ-bolometer technology in *Infrared Technology and Applications XXXIV*, edited by F. A. Bjorn, F. F. Gabor and R. N. Paul. SPIE vol. 6940 (2008) pp. 694020-1 to 694020-10.

D. Murphy, et al., 640 x 512 17 μm Microbolometer FPA and Sensor Development in *Infrared Technology and Applications XXXIII*, edited by F. A. Bjorn, F. F. Gabor and R. N. Paul (SPIE vol. 6542 (2007) pp. 65421Z-1 to 65421Z-10.

R. Blackwell, et al., Uncooled VOx Thermal Imaging Systems at BAE Systems in *Infrared Technology and Applications XXXIV*, edited by F. A. Bjorn, F. F. Gabor and R. N. Paul. SPIE vol. 6940, (2008) pp. 694021-1 to 694021-8.

T. Schimert, et al., Amorphous silicon based large format uncooled FPA microbolometer technology in *Infrared Technology and Applications XXXIV*, edited by F. A. Bjorn, F. F. Gabor and R. N. Paul. SPIE vol. 6940 (2008) pp. 694023-1 to 694023-7.

A. Flusberg, et al., Thermal-to-Visible Transducer (TVT) for Thermal-IR Imaging in *Infrared Technology and Applications XXXIV*, edited by F. A. Bjorn, F. F. Gabor and R. N. Paul (SPIE vol. 6940 (2008) pp. 694015-1 to 694015-12.

J. Zhang, et al., Performance Evaluation and Analysis for Carbon Nanotube (CNT) based IR Detectors in *Infrared Technology and Applications XXXIII*, edited by F. A. Bjorn, F. F. Gabor and R. N. Paul. SPIE vol. 6542 (2007) pp. 65421N-1 to 65421N-9.

I. W. Kwon, et al., A High Fill-Factor Uncooled Infrared Detector with Thermo-Mechanical Bimaterial Structure in *Infrared Technology and Applications XXXIII*, edited by F. A. Bjorn, F. F. Gabor and R. N. Paul. SPIE vol. 6542 (2007) pp. 65421O-1 to 65421-O-10.

N. Lavrik, et al., Uncooled MEMS IR Imagers with Optical Readout and Image Processing in *Infrared Technology and Applications XXXIII*, edited by F. A. Bjorn, F. F. Gabor and R. N. Paul. SPIE vol. 6542 (2007) pp. 65421E-1 to 65421E-8.

N. V. Lavrik, et al., Uncooled infrared imaging using bimaterial microcantilever arrays in *Infrared Technology and Applications XXXII*, edited by F. A. Bjorn, F. F. Gabor and R. N. Paul. SPIE vol. 6206 (2006) pp. 62061K-1 to 62061K-8.

N. Xi, et al., Carbon Nanotube-Based Color IR Detectors in *Infrared Technology and Applications XXXIV*, edited by F. A. Bjorn, F. F. Gabor and R. N. Paul. SPIE vol. 6940 (2008) pp. 694017-1 to 694017-12.

J. P. Salerno, High Frame Rate Imaging Using Uncooled Optical Readout Photomechanical IR Sensor in *Infrared Technology and Applications XXXIII*, edited by F. A. Bjorn, F. F. Gabor and R. N. Paul. SPIE vol. 6542 (2007) pp. 65421D-1 to 65421D-9.

M. Wagner, et al., Solid State Optical Thermal Imagers in *Infrared Technology and Applications XXXIII*, edited by F. A. Bjorn, F. F. Gabor and R. N. Paul. SPIE vol. 6542 (2007) pp. 65421P-1 to 65421P-10.

A. S. Weiling, et al., Antenna-Coupled Microbolometers for Multi-Spectral Infrared Imaging in *Infrared Technology and Applications XXXII*, edited by F. A. Bjorn, F. F. Gabor and R. N. Paul. SPIE vol. 6206 (2006) pp. 62061F-62061F-8.

A. Bergeron, et al., Dual-Band Dual Field-Of-View TVWS Prototype in *Infrared Technology and Applications XXXII*, edited by F. A. Bjorn, F. F. Gabor and R. N. Paul. SPIE vol. 6206 (2006) pp. 62061O-1 to 62061O-10.

A. Donval, et al., Novel filter providing human eye and optical sensors protection from the visible into the IR in *Infrared Technology and Applications XXXIV*, edited by F. A. Bjorn, F. F. Gabor and R.N. Paul. SPIE vol. 6940 (2008) pp. 69400Z-1 to 69400Z-10.

J. Vizgaitis, et al., $3^{rd}$ Generation FLIR Demonstrator in *Infrared Technology and Applications XXXIV*, edited by F. A. Bjorn, F. F. Gabor and R. N. Paul. SPIE vol. 6940 (2008) pp. 69400U-1 to 69400U-10.

C. L. Jones, et al., Multi-colour IRFP As made from HgCdTe grown by MOVPE in *Infrared Technology and Applications XXXIII*, edited by F. A. Bjorn, F. F. Gabor and R. N. Paul (SPIE vol. 6542 (2007) pp. 654210-1 to 654210-8.

D. F. King, et al., $3^{rd}$-Generation 1280 x 720 FPA development status at Raytheon Vision Systems in *Infrared Technology and Applications XXXII*, edited by F. A. Bjorn, F. F. Gabor and R. N. Paul. SPIE vol. 6206 (2006) pp. 62060W-1 to 62060W-15.

O. Schreer, et al., Dual-band camera system with advanced image processing capability in *Infrared Technology and Applications XXXIII*, edited by F. A. Bjorn, F. F. Gabor and R. N. Paul. SPIE vol. 6542 (2007) pp. 65421C-1 to 65421C-7.

T. L. Ferrell, et al., The photon scanning tunneling microscope, *Journal of Vacuum Science & Technology* B9 (1991) pp. 525-530.

J. M. Guerra, Photon tunneling microscopy, *Applied Optics* vol. 29 No. 26 (1990) pp. 3741-3752.

J. M. Guerra, Photon tunneling microscopy of diamond-turned surfaces, *Applied Optics* vol. 32, No. 1 (1993) pp. 24-26.

R. C. Reddick, et al., Photon scanning tunneling microscopy, Physical Review of Scientific instruments, vol. 61 (1990) pp. 3669-3677.

R. C. Reddick, et al., New form of scanning optical microscopy, Physical Review B vol. 39 (1989) pp. 767-770.

T. Perazzo, et al., Infrared vision using uncooled micro-optomechanical camera in *Infrared vision using uncooled micro-optomechanical camera*. Applied Physics Letters, vol. 74, No. 23. (1999) pp. 3567-3569.

Yang-Zhao, et al., Optomechanical Uncooled Infrared Imaging System: Design, Microfabrication, and Performance. *Journal of Microelectromechanical Systems*, vol. 11, No. 2 (2002) pp. 136-146.

S. Shi, et al., Design of a Novel Substrate-Free Double-Layer-Cantilever FPA Applied for Uncooled Optical-Readable Infrared Imaging System. *IEEE Sensor Journal*, vol. 7, No. 12 (2007) pp. 1703-1710.

F. Fei, et al., A Novel-All-Light Optically Readable Thermal Imaging Sensor Based on Mems Technology in *State Key Laboratory of Transducer Technology, Shanghai Institute of Microsystem and Information Technology, Chinese Academy of Science Shanghai*, 200050, China (2003) pp. 513-516.

J. Cites, et al. Analysis of photo scanning tunneling microscope Images, *J. App. Phys.*, vol. 71 (1), (1992) pp. 7-10.

G. Bebis, et al., Face recognition by fusing thermal infrared and visible imagery, *Image and Vision Computing*, vol. 24 (2006) pp. 727-742.

W. Lingxue, et al., Real-time color transfer system for low-light level visible and infrared, images in YUV color space, *Proc. of SPIE*, vol. 6567 (2007) pp. 65671G-1 to 65671G-8.

S. R. Manalis, et al., Two-dimensional micromechanical bimorph arrays for detection of thermal radiation, *App. Phys. Lett.*, vol. 70 (24) (1997) pp. 3311-3313.

G. Huang, et al., Visual and infrared dual-band false color image fusion method motivated by Land's experiment, *Optical Engineering*, vol. 46(2) (2007) pp. 027001-1 to 027001-10.

*The World Market for Commercial and Dual-Use Military Infrared Imaging and Infrared Thermometry Equipment*, published by Maxtech International, Inc., Fairfield, CT; (2006) Section 4.2, pp. 134-136.

\* cited by examiner

VARIABLE WAVEBAND INFRARED IMAGER

This invention was made with governmental support under Contract No. DE-AC05-00OR22725 awarded by the U.S. Department of Energy. The government has certain rights in the invention.

BACKGROUND OF THE INVENTION

1. Technical Field

This invention relates to imaging systems, and more particularly, to systems that may image visible or infrared wavelengths.

2. Related Art

Infrared imaging systems provide image detail that may not be identifiable in a visible image. Some infrared imaging systems amplify the light in the visible or visible and short wave infrared spectral regions (wavelengths less than 1.2 µm). The amplified light is generally reflected light produced at night by outdoor lighting, the moon or by starlight. In these systems, the imagers' detection capabilities are dependent on the ambient lighting conditions. Thus, these systems are unusable in foggy or heavily overcast evening situations, or in unlighted enclosed spaces, such as caves or smoke filled buildings.

Other systems may operate in the mid wavelength infrared spectral region (wavelengths between 2.8 µm and 5.5 µm) or the long wavelength infrared spectral region (wavelengths between 7.5 µm and 14 µm). These systems may detect thermal radiation emitted by warm objects, whether animate or inanimate, irrespective of the lighting conditions. These ambient light and thermal imaging systems utilize separate cameras to create a superimposed image of the scene having both visible and infrared components. One camera captures the visible imagery while a second camera captures the infrared imagery. The images are then post-processed to obtain a composite image that is presented to a display or observer. Thus, these imaging devices require multiple camera systems and complex electronics in order to create a combined visible image.

SUMMARY

A variable waveband infrared imager comprises an imaging pixel that utilizes photon tunneling with thermally actuated bimorph structures to convert infrared radiation to visible radiation that may be overlaid on a visible light image. A substrate having a thickness is transparent to infrared radiation emanating from an image, and may also be transparent to visible wavelengths of light emanating from the image. A plate material is positioned above and spaced apart from the transparent substrate. A portion of the plate material comprises a bimorph structure having a lower film material with a different coefficient of thermal expansion from the plate material. A light source is positioned to introduce visible wavelengths of light into the thickness of the transparent substrate and generate an evanescent electric field above the transparent substrate. The plate material may be transparent to the visible radiation, but may absorb the incident infrared radiation, converting a portion of it to heat in the plate material and the bimorph structure. The generated heat causes the bimorph structure and plate material to deflect towards the transparent substrate and into the evanescent electric field. In response to the bimorph structure and the plate material entering the evanescent electric field, some of the visible light propagating through the transparent substrate may tunnel through the transparent substrate, the bimorph structure, and the plate material, and emerge as visible radiation that is proportional to the intensity of the incident infrared radiation. Where visible wavelengths of light emanating from the image are passed through the imaging pixel, the converted visible radiation based on the incident infrared radiation may be superimposed on the passed through visible wavelengths to enhance a viewer's perception of the image.

In other variable waveband imagers, the substrate material may be transparent to infrared radiation, but may absorb visible wavelengths of light emanating from an image. In these variable waveband imagers, infrared radiation from a scene may be converted into visible radiation.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A variable waveband imager may simultaneously overlaying a visible image with a corresponding image related to the image's infrared radiation. Visible light from a scene may pass through the imager and may be used to image the scene in the visible spectrum. At substantially the same time, the imager may convert incoming infrared radiation corresponding to the scene to a visible signal that may be overlaid on the visible image. When embodied or integrated into an optical device, the variable waveband imager may be used in compact, low power, lightweight imaging devices. These imaging devices may include binocular type devices such as night vision goggles or other multiple optical viewing devices, as well as monocular type devices such as telescopes, rifle sights, cameras, or other single optical viewing devices.

Figure 1:
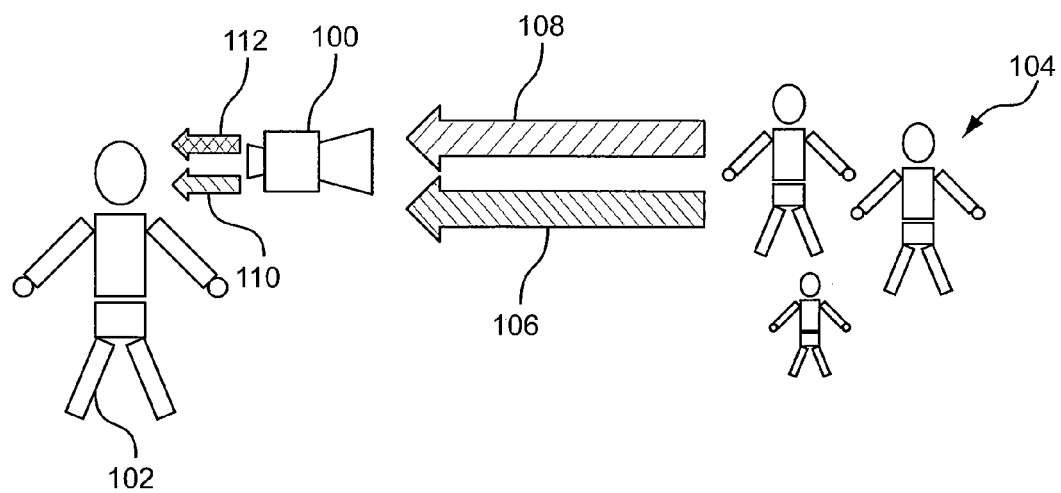
FIG. 1 is a variable waveband imager integrated into an optical device.

FIG. 1 is a variable waveband imager 100 integrated into an optical device. In FIG. 1, a scene 104 of an animate or inanimate object transmits visible wavelengths 106 and infrared radiation 108 towards the variable waveband imager 100 spaced away from the scene 104. Some common glass does not transmit infrared radiation, thus where the variable waveband imager is embodied or integrated into an optical device allowing the observer 102 to view an output image, that images infrared radiation, through the optical device, the optical lens used to focus the scene 104 onto the variable waveband imager should comprise a material that transmits at least infrared radiation. Examples of some materials that may be used as the focusing optical lens are described below.

In FIG. 1, visible wavelengths 106 are received at the optical device incorporating the variable waveband imager 100 and pass through to the observer 102 as visible wavelengths 110. At substantially the same time that the visible wavelengths 106 are received at the variable waveband imager 100, infrared radiation 108 is received at the variable waveband imager 100. The infrared radiation may be wavelengths in the short, mid, or long infrared spectral region. The peak emission of radiation of humans is generally found within the long infrared spectral region, with a small amount also detectable in the mid infrared spectral region. Therefore, some variable waveband imagers may be designed to focus on one or both of these infrared spectral regions.

Upon receiving the infrared radiation 108, the variable waveband imager 100 operates to convert this radiation into visible radiation 112. The visible radiation 112 is transmitted out of the variable waveband imager 100 and may have an intensity that is proportional to the radiation level of the received infrared radiation 108. A composite signal comprising the overlay of the passed through visible wavelengths 110 and the visible radiation 112 resulting from the infrared wavelengths 108 may be presented to the observer 102 or may be captured and recorded on a medium for later playback. Because the composite signal comprises visible wavelengths at this point, image forming optics used to present the combined image to the observer 102 may be any type of visible lens optics.

Figure 2A:
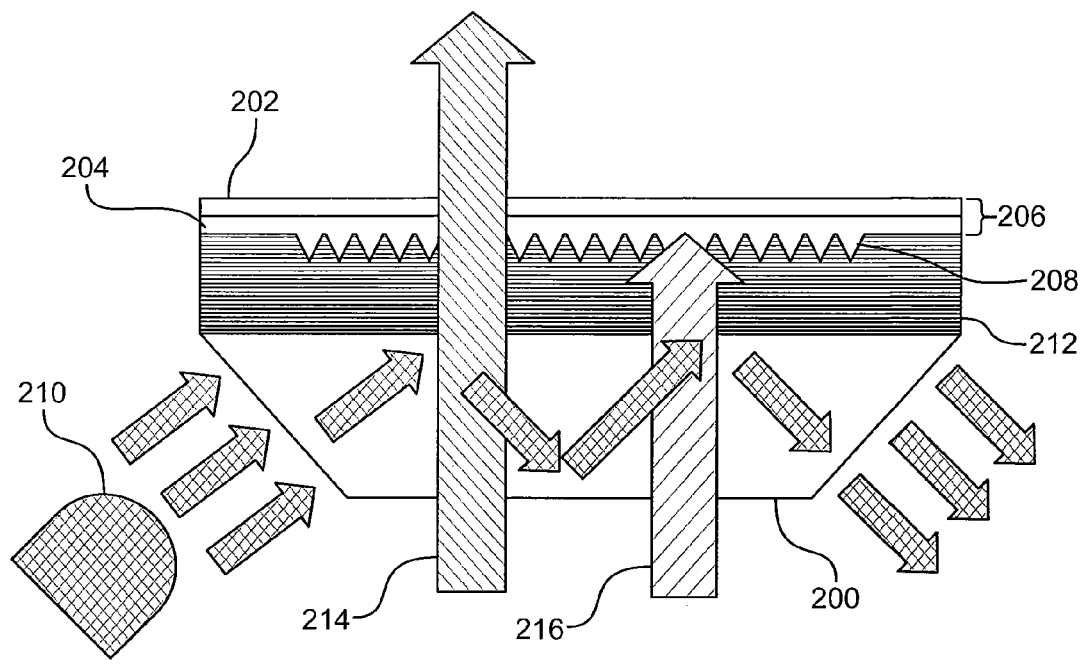
FIG. 2A is a cross-section illustration of the structure and operation of a portion of a variable waveband imager.
Figure 2B:
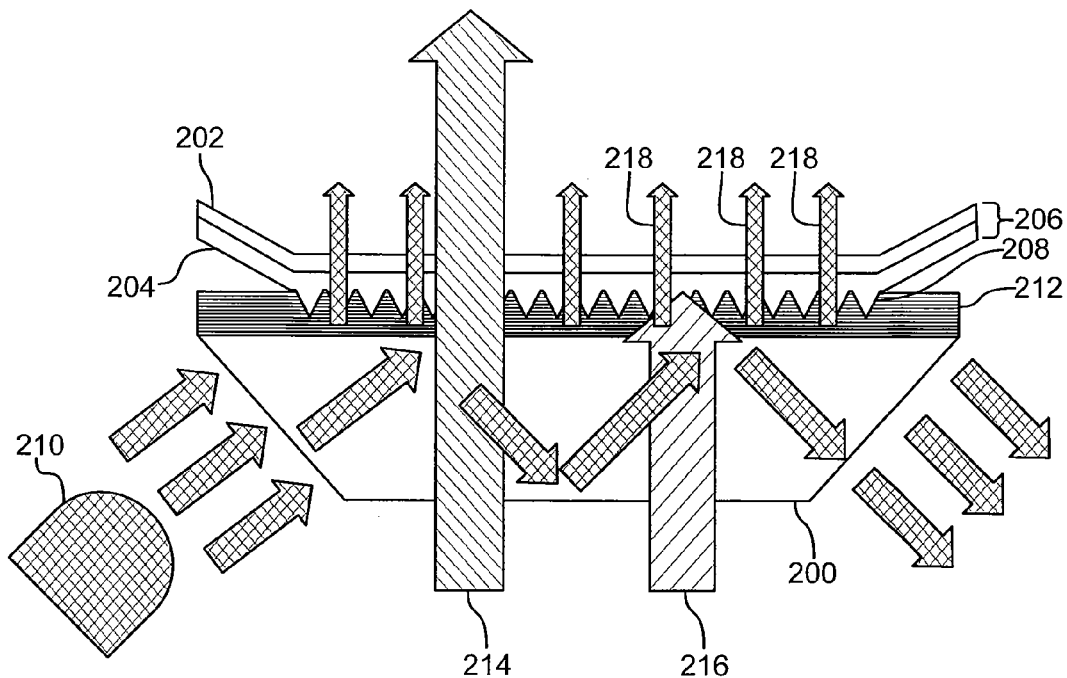
FIG. 2B is a cross-section illustration of the structure and operation of a portion of a variable waveband imager.

FIGS. 2A and 2B are cross-section illustrations of the structure and operation of a portion of a variable waveband imager. The structure shown in FIGS. 2A and 2B represents a single imaging pixel that may be part of a larger variable waveband imager. Each imaging pixel may be on the order of approximately 15 µm to approximately 50 µm in length. The variable waveband imager may be accomplished using a two dimensional array of MEMS (micro-electromechanical system) fabricated imaging pixels. Depending on the application, the size of the array may vary. In some applications, the arrays may be sized from 256 pixels by 256 pixels to 1000 pixels by 1000 pixels. In other applications, smaller or larger arrays may be used. Some variable waveband imagers may include arrays sized in the range of approximately 1 cm to approximately 3 cm square.

In FIGS. 2A and 2B, the imaging pixel is built on a substrate 200 that is transparent to both visible wavelengths and infrared radiation. Some transparent substrates 200 that may be used with the variable waveband imager include zinc selenide (ZnSe), sapphire, silica, polypropylene, or diamond films. The transparent substrate 200 may be a thin substrate on the order of approximately 100 µm to approximately 5 mm thick.

Positioned above and spaced apart from the transparent substrate 200 by a gap or a vacuum gap is an infrared absorbing and photon tunneling plate 202. This plate is comprised of a material or film that is also transparent to visible wavelengths, but absorbs infrared wavelengths. Affixed or formed to a portion of the underside of the absorbing and tunneling plate 202 (e.g., upper pixel film) is a lower pixel film 204 that is transparent to both visible and infrared radiation. The area of the imaging pixel where the absorbing and tunneling plate 202 and the lower pixel film 204 are affixed or formed together forms a bimorph structure 206. Portions of the lower pixel film 204 may be corrugated or formed with ridges or bends 208 to enable the bimorph structure 206 to move closer to the transparent substrate 200 for a given amount of infrared radiation—thereby enhancing the sensitivity of the imaging pixel. Although not shown in FIG. 2A or 2B, portions of the plate material 202 where the lower pixel film 204 is not present may also be corrugated or formed with ridges or bends. These ridges or bends in the plate material 202 provide one or multiple points where the plate material 202, absent the lower pixel film, may penetrate an evanescent field 212 emanating from the transparent substrate 200. At these regions photons may tunnel across the vacuum gap and into the plate material 202. These regions may also help direct the visible light in the vertical direction. The corrugations may be uniformly distributed across the lower surface of the plate material 202 where the lower pixel film 204 is not present.

Each of the plate material 202 and the lower film 204 has a different coefficient of thermal expansion. More specifically, the plate material 202 may have a low thermal expansion coefficient while the lower film 204 has a high thermal coefficient of expansion. Due to the difference in the films' thermal expansion coefficients, when the bimorph structure 206 is heated, the bimorph structure 206 will deform and bend. Because the lower film 204 has a higher thermal expansion coefficient, when the bimorph structure 206 is heated, the bimorph structure 206 bends towards the transparent structure 200, as shown in FIG. 2B. The bending of the bimorph structure 206 towards the transparent structure 200 causes the other portions of the plate material 202 (e.g., portions not affixed with the lower pixel film 204) to also bend towards the transparent substrate 200. In some imaging devices, it may be desired that the difference between the thermal expansion coefficients of the plate material 202 and the lower pixel film 204 be as large as possible.

A light source 210 that emits a visible monochromatic wavelength is positioned near the transparent substrate 200. Based on the index of refraction of the transparent substrate 200, the light source 210 may be oriented such that the emitted monochromatic wavelength propagates entirely through the transparent substrate 200 when the angle of incidence is less than the critical angle of the transparent substrate 200. Once the angle of incidence becomes approximately greater than the critical angle of the transparent substrate 200, the monochromatic wavelengths multiply reflect from the top and bottom surfaces of the transparent substrate 200, and create an evanescent electric field 212 in the vacuum gap above the transparent substrate 200. This evanescent electric field may decay exponentially in the direction away from the surface of the transparent substrate 200.

Selection of the transparent substrate 200 material or the light source 210 may also affect the uniformity of the evanescent electric field 212. If the absorption rate of the light introduced into the transparent substrate 200 is low, the uniformity of the light intensity will improve across the transparent substrate 200 thereby increasing the uniformity of the decaying evanescent field 212.

As shown in FIGS. 2A and 2B, visible wavelengths 214 incident on the imaging pixel passes through the transparent substrate 200 and the bimorph structure 206. Additionally, these visible wavelengths 214 would also pass through the transparent substrate 200 and portions of the plate material 202 where the lower pixel film 204 is not present. Infrared radiation 216 that is incident on the imaging pixel is transmitted through the transparent substrate 200, but is absorbed by the plate material 202; both where the lower pixel film 204 is present and where it is absent. This absorption generates a small amount of heat in the plate material 202 and the bimorph structure 206. In response to the generated heat, and due to the difference of the thermal expansion coefficients in the plate 202 and the lower film 204, the bimorph structure 206 deforms and bends towards the transparent substrate 200. The amount of bending of the bimorph structure 206 is proportional to the amount of infrared radiation incident on the bimorph structure 206.

As the bimorph structure 206 bends towards the transparent substrate 200, the distance between the bimorph structure 206 and the transparent substrate 200 is reduced. The bending of the bimorph structure 206 also causes the portions of the plate 202 without the lower pixel film 204 to bend towards the transparent substrate 200. In the areas of the plate material 202, where the lower film 204 is not present, the bending will not be as pronounced, and thus the deformed plate material 202 may be more bowed near the bimorph structure 206 with decreasing curvatures extending away from portions of the bimorph structure 206.

As the bimorph structure 206 approaches the transparent substrate 200, the decaying evanescent electric field 212 penetrates the vacuum gap and the interface of the bimorph structure 206. As a result, the visible monochromatic wavelengths in the transparent substrate 200 tunnel into the bimorph structure 206. By selecting an appropriate thickness of the bimorph structure 206, the visible tunneled wavelengths may pass through the bimorph structure 206 and be converted to visible radiation 218.

Similarly, as the portions of the plate material 202 without the lower pixel film 204 approach the transparent substrate 200, the evanescent electric field 212 penetrates the vacuum gap and plate material 202 interface, and the visible monochromatic wavelengths in the transparent substrate 200 tunnel into the plate material 202. By selecting an appropriate thickness of the plate material 202, the visible tunneled wavelengths may pass through the plate material 202 and be converted to visible radiation 218.

In some variable waveband imaging pixels, the visible radiation 218 may be proportional in intensity to that of the incident infrared radiation 216. The greater the intensity of the incident infrared radiation 216, the greater the temperature increase will be in the bimorph structure 206, and the further the bimorph structure 206 and the plate material 202 without the lower pixel film 204 will penetrate into the decaying electric field 212.

The converted visible radiation 218 may be superimposed over the visible light 214 thereby fusing both the visible and infrared images together. As described, no optical-to-electric or electric-to-optical image processing or conversion is required in order to combine the two images.

Figure 3:
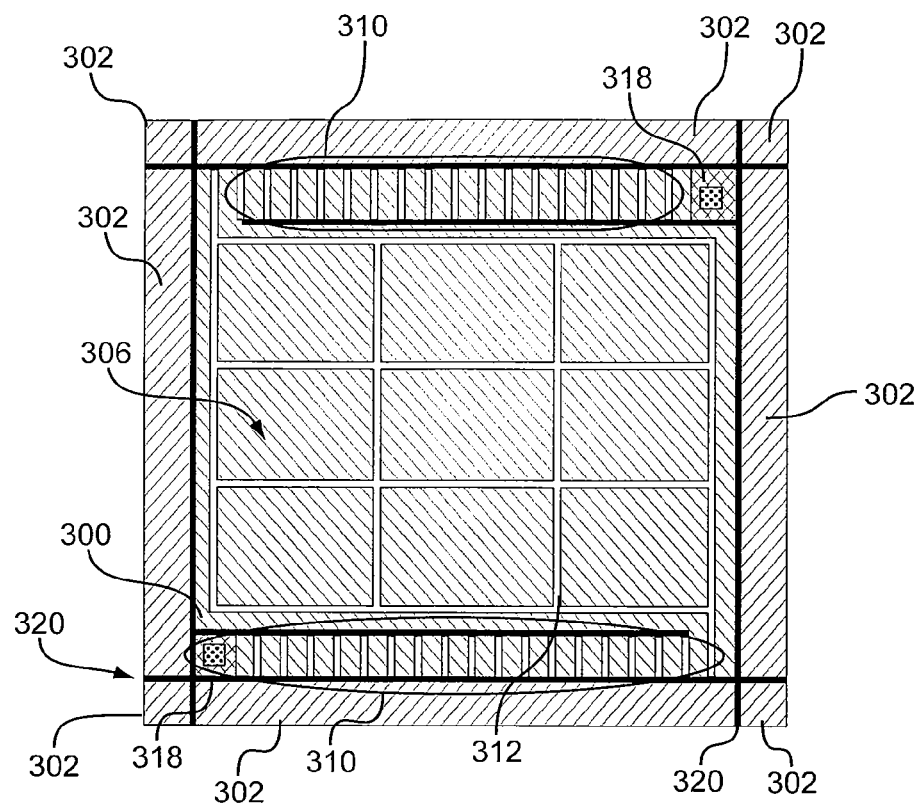
FIG. 3 is a plan view of a variable waveband imaging pixel.

FIG. 3 is a plan view of a variable waveband imaging pixel. The variable waveband imaging pixel 300 may be spaced apart from adjacent imaging pixels 302 within a variable waveband imaging array by spacing voids 320. The plate material 306 (without an underlying lower pixel film) is spaced apart from the underlying transparent substrate (not shown) by anchor structures 318. To reduce the amount of heat absorbed by structures other than the plate material 306 when infrared radiation is incident on the variable waveband imaging pixel 300, the anchor structures 318 may be fabricated from low thermal conductive material. In some designs, the anchors 318 may be hollow structures, while in other designs the anchors 318 may be solid structures, or hollow structures filled with a separate low thermal conductive material. Although depicted in FIG. 3 as having two anchors 318, each variable waveband imaging pixel 300 may include one or multiple anchors 318 that may be positioned at varying locations around the pixel. In FIG. 3, the variable waveband imaging pixel 300 is anchored at opposite corners. As shown in FIG. 3, bimorph structures 310 extend across the top and bottom of the dual waveband imaging pixel 300. The bimorph structures 310 in FIG. 3 are illustrated with a ladder-like image to designate that the bimorph structures 310 include corrugations or ridges. These corrugations or ridges help to increase the flexibility and responsivity of the bimorph structure 310. The rigidity of the imaging pixel 300 may be increased by the formation of depression voids or trenches 312 in the plate material 306. When present, these depression voids or trenches 312 should have a height approximately no larger than the height of any corrugations or bends in the bimorph structure 310.

Figure 4:
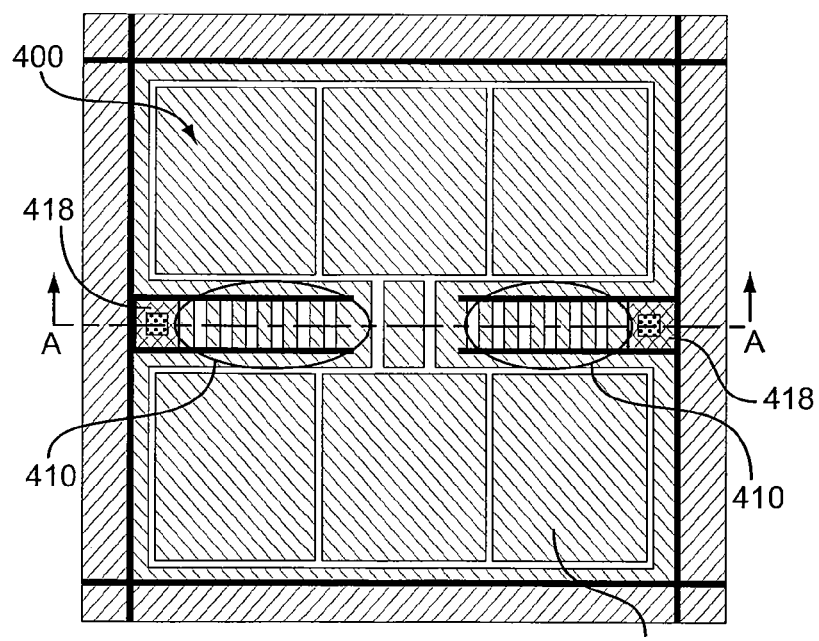
FIG. 4 is a plan view of an alternate variable waveband imaging pixel.

FIG. 4 is a plan view of an alternate variable waveband imaging pixel. In FIG. 4, the anchors 418 are positioned opposite one another on opposing sides of the variable waveband imaging pixel 400, such that the imaging pixel has a mirrored configuration. Placement of the anchors 418 in these positions allows for a more symmetric bending force on the bimorph structures 410 in response to changes in the temperature of the imaging pixel 400. Thus, when the bimorph structures 410 absorb incident infrared radiation, the bimorph structures 410 bend near the center of the variable waveband imaging pixel. In response to this bending, the outer portions of the plate material 402 may also bend towards the underlying transparent substrate such that the imaging pixel may have a flat or convex like shape.

Figure 5:
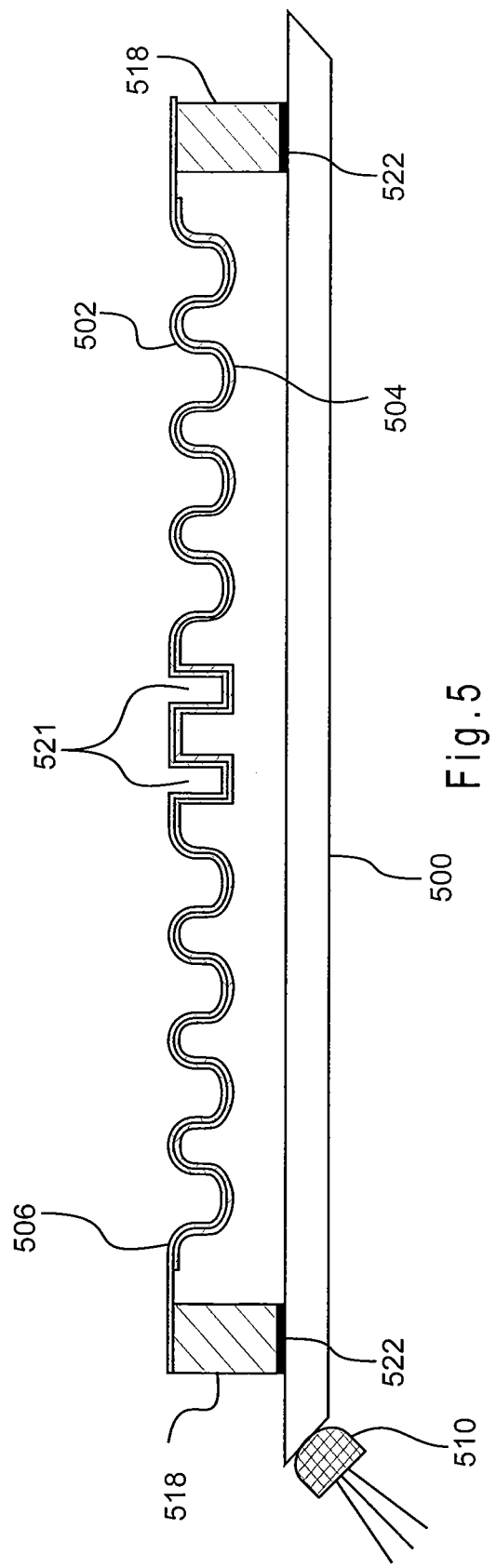
FIG. 5 is a cross-sectional illustration of the variable waveband imaging pixel of FIG. 4 along line A-A.

FIG. 5 is a cross-sectional illustration of the variable waveband imaging pixel of FIG. 4 along line A-A. In FIG. 5, the bimorph structure 506 is supported above the transparent substrate 500 by two anchors 518. A light blocking layer 522 may be positioned between the transparent substrate 500 and the base of the anchors 518. This light blocking layer 522 may block light propagating within the transparent substrate 500 from being transmitted into the anchors 518, thereby creating unwanted background light in the variable waveband imaging pixel. In some variable waveband imaging pixels, the light blocking layer 522 may be fabricated using photolithographic and thin film deposition and etch techniques.

To increase the responsivity and flexibility of the dual waveband imaging pixel, the bimorph structures 506 have a corrugated shape and are joined at the center by stiffening trenches 521. In FIG. 5, the light source 510 responsible for propagating the visible monochromatic wavelengths through the transparent substrate 500 may include one or multiple diode lasers that are powered by an appropriate power source (not shown).

Figure 6:
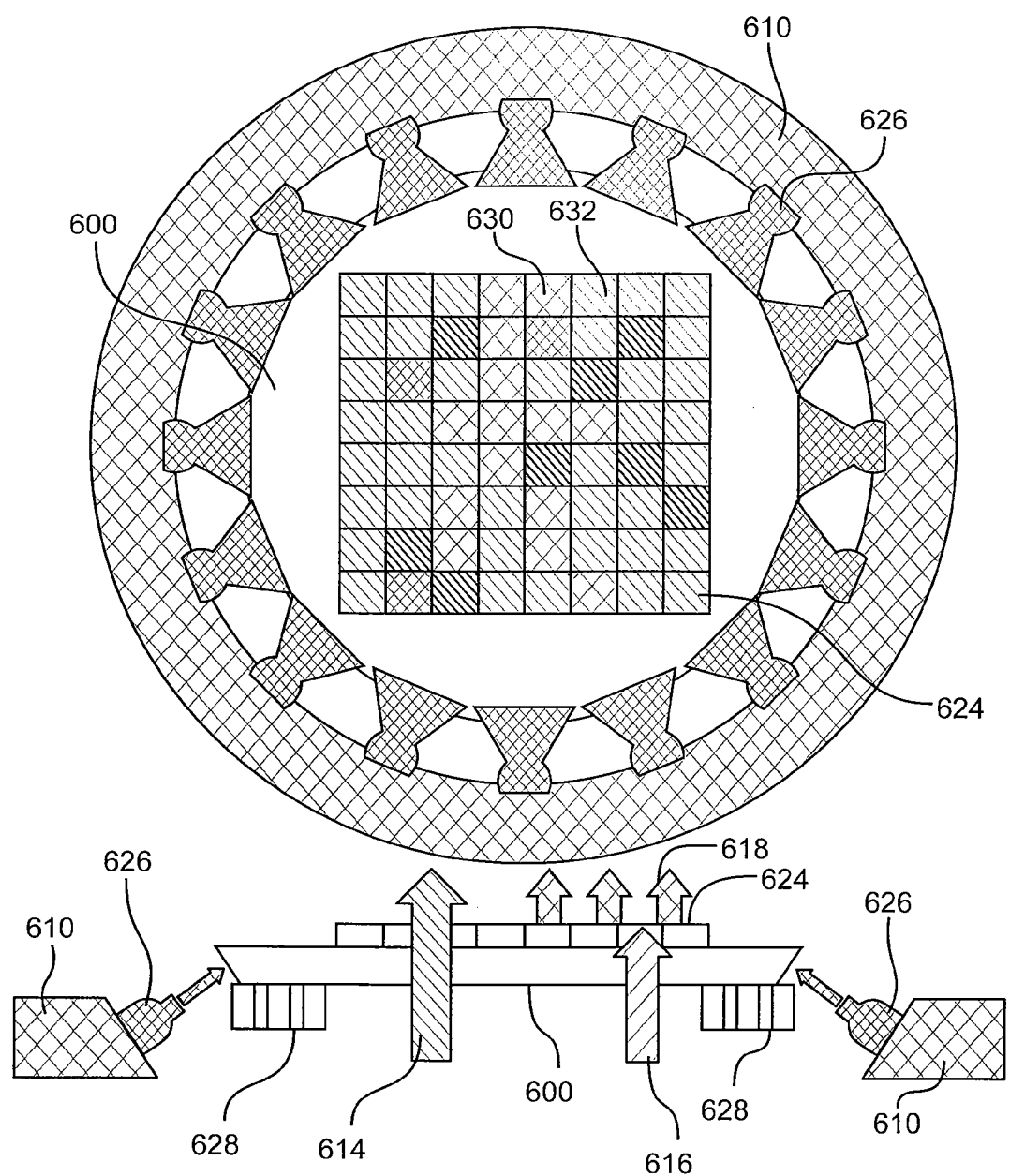
FIG. 6 is a plan and cross-section illustration of a variable waveband imaging array.

FIG. 6 is a plan and cross-section illustration of an exemplary low spatial resolution variable waveband imaging array. In FIG. 6, the variable waveband imaging array comprises an 8 by 8 array of variable waveband imaging pixels 624. Other variable waveband imaging arrays may contain different numbers of pixels and array formats, ranging from a single point detector (one pixel) to a multi megapixel array. The variable waveband imaging pixels 624 are positioned above a transparent substrate 600. In FIG. 6, multiple light sources 610 are positioned in a ringed arrangement around the transparent substrate 600 to aid in the substantial uniformity of the monochromatic wavelengths propagating through the transparent substrate 600, and the creation of the evanescent electrical field between the top of the transparent substrate 600 and the variable waveband imaging pixels 624.

In FIG. 6, radial diffusion lens 626 are shown used in conjunction with the variable waveband imager. The radial diffusion lens 626 may be positioned between the transparent substrate 600 and the light sources 610 to help distribute the monochromatic wavelengths throughout the transparent substrate 600 in a substantially uniform manner. Visible wavelengths 614 and infrared radiation 616 are incident upon a surface of the transparent substrate 600. The visible wavelengths 614 pass through the transparent substrate 600 and the variable waveband imaging pixels 624, while the infrared radiation 616 is absorbed by the variable waveband imaging pixels 624. As a result of the absorption of the infrared radiation 616 and the configuration of the variable waveband imaging pixels 624, a portion of the monochromatic light propagating through the transparent substrate 600 may tunnel across the vacuum gap to the variable waveband imaging pixels 624. This visible radiation, labeled as 618 in FIG. 6, is proportional to the amount of infrared radiation 616 incident on the initial surface of the transparent substrate 600.

As shown in FIG. 6, imaging pixels with a checkered hatching (e.g., 630) illustrate pixels that contain a visible radiation, based on the incident infrared radiation, that has been superimposed on passed through visible wavelengths. Also in FIG. 6, imaging pixels with a diagonal hatching (e.g., 632) illustrate pixels that contain visible wavelengths, and that do not contain visible radiation based on the incident infrared radiation. The intensity of the visible radiation and visible wavelengths received at the imaging pixel may vary depending on the respective incident intensity. As illustrated in FIG. 6, imaging pixels whose hatching lines are closer together are intended to represent a greater intensity.

To help stabilize the temperature of the variable waveband imager, or an optical device embodying or integrating the same, a cooling device may be positioned around or below the transparent substrate to stabilize the variable waveband imaging pixels, or an array of such pixels, against fluctuations in the temperature surrounding the variable waveband imager. The cooling device may be powered by the same source that powers the light source positioned near the transparent substrate. Alternatively, the cooling device may be powered by a separate power source. The cooling device may be controllable by a thermostat or other variable control and/or feedback device to maintain a stable or substantially stable temperature in the variable waveband imager.

In FIG. 6, a thermoelectric cooler 628 is configured in a ring orientation below the transparent substrate 600. In other designs, the thermoelectric cooler may be configured as parallel plates separated by electrical contacts. In other alternative designs, other cooling devices may be used to control the temperature of the dual waveband imager.

The variable waveband imager may utilize MEMS (microelectromechanical systems) fabrication technology to integrate the structures of the variable waveband imaging pixels on to wafers or chips. Use of MEMS fabrication technology may reduce the complexity, improve reliability, and reduce costs of the dual waveband imager, while providing packaging flexibility. Each of the variable imaging pixels may range from approximately 15 µm to approximately 50 µm in pitch, and may be combined together to form pixel arrays whose size may vary depending on a desired application. To substantially thermally isolate the bimorph structure from the underlying transparent substrate, the anchors may be fabricated from low thermal conductivity dielectric materials. To substantially improve the responsivity and thermal isolation of the pixel, the bimorph structure may be formed using dielectric thin film materials with large differences in their coefficients of thermal expansion and low thermal conductivities, respectively. Larger differences in thermal expansion coefficients lead to higher sensitivity imaging of the infrared radiation. Additionally, the selection of dielectric materials as the bimorph structure provide the benefit that these materials are highly transparent to visible light but posses the ability to absorb infrared radiation, especially infrared radiation in the long wavelength spectral region.

In some variable waveband imagers, the upper portion of the bimorph structure and the plate material without the lower pixel film may be fabricated from a low thermal expansion film, such as silicon dioxide, deposited using plasma-enhanced chemical vapor deposition (PECVD) techniques. The lower bimorph film may be a higher thermal expansion polymer film, such as polycarbonate, polypropylene, a photoresist epoxy such as SU8, or other high coefficient of thermal expansion polymer.

To support the bimorph structure and the plate material of the variable waveband imager above the transparent substrate, the anchors may be fabricated from material having a low density and low thermal conductance. In some variable waveband imagers, these anchors may be fabricated from a solid-state substance similar to gel where the liquid component is replaced with a gas, such as aerogel or silicon dioxide aerogel. These anchors may support the bimorph structure approximately 100 nm to approximately 2 µm above the transparent substrate.

In some variable waveband imagers, a probe laser powered by an appropriate power source may be used as the light source that propagates visible light through the transparent substrate. While any visible wavelength or monochromatic wavelength may be emitted from the light source, a green monochromatic light source offers the advantage that the human eye is more responsive to green radiation than to other wavelengths.

Figure 7:
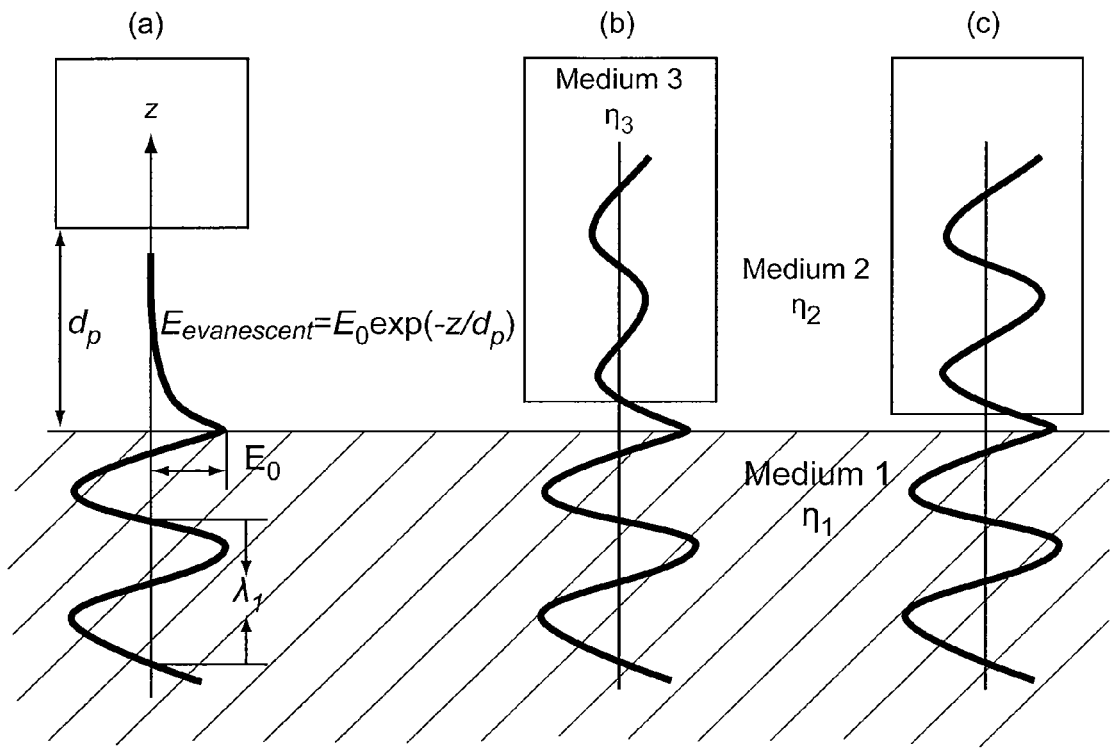
FIG. 7 is an illustration of photon tunneling.

FIG. 7 is an illustration of the photon tunneling technique. In FIG. 7, three mediums are shown each having a different index of refraction, η. A photon beam is shown at a given moment propagating through medium 1 which has an index of refraction $\eta_1$. The photon beam is directed to the interface boundary between a second medium (air) with an index of refraction $\eta_2$. As the angle of incidence is increased from zero (e.g., away from the normal to the surface) the angle of refraction of the transmitted radiation increases until at a critical angle ($\theta_{crit}$) the transmission angle reaches 90 degrees and total internal reflection occurs—no light is transmitted through the interface into medium 2. Conservation of energy and matching boundary conditions requires that when the angle of incidence θ is approximately greater that $\theta_{crit}$ an exponentially decaying electric field generated in part by the propagating visible light penetrates into medium 2 with the electric field vector perpendicularly aligned to the interface surface (see FIG. 7a). Due to the exponential decay of the electric field away from the interface, this field may be known as an evanescent field.

In FIG. 7a, a photon beam at a given moment in time is shown propagating in medium 1 with electric field amplitude $E_0$. Although shown schematically in the figure propagating perpendicular to the surface, in practice, the beam may be propagated at an oblique angle such that the angle of incidence θ is approximately greater than the critical angle $\theta_{crit}$— the angle at which light is total internally reflected at the boundary between medium 1 and medium 2 when the index of refraction for medium 1 ($\eta_1$) is greater than that for medium 2 (e.g., $\eta_1 > \eta_2$). At incidence angles $\theta$ approximately greater than $\theta_{crit}$ the propagated light is refracted and transmitted through the interface such that a portion of it propagates into medium 2.

The exponentially decaying evanescent field created when the propagating light is internally reflected in medium 1 is given by $E_{evanescent}(z) = E_0 \exp(-z/d_p)$, where z is the distance from the interface surface and $d_p$ is the characteristics decay length and is given by $d_p = \lambda_1/(2\pi(\sin^2\theta - \eta^2_{21})^{1/2})$, where $\lambda_1$ is the wavelength of the light, $\theta$ is the angle of the transmitted light in medium 1 with respect to the normal at the interface between medium 1 and 2, and $\eta_{21}$ is the ratio of the refractive indices for medium 1 and 2 respectively.

Figure 8:
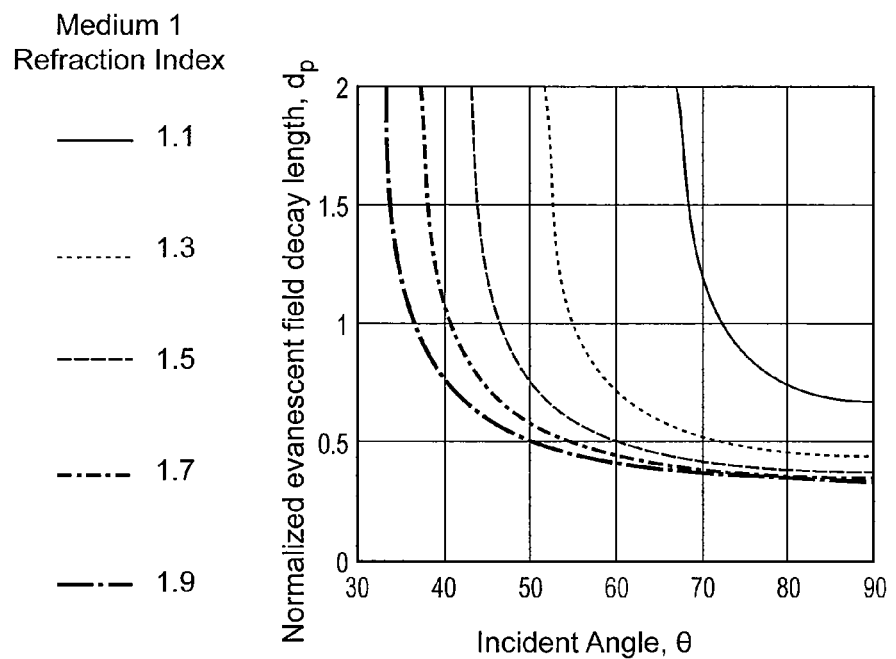
FIG. 8 is a plot of a normalized evanescent electric field intensity decay length as a function of an incident angle for several ratios of indices of refraction.

The wavelength normalized decay length, $d_p/\lambda_1$, is plotted in FIG. 8 as a function of the angle of incidence of the light for several ratios of the refractive indices of medium 1 and medium 2 ($\eta_{21}$) from approximately 1.1 to approximately 1.9. The decay length rapidly increases when the propagated light approaches the critical angle. The critical angle increases as the ratio $\eta_{21}$ increases. These calculations show that decay lengths of several hundred nanometers to several microns are possible when visible light (e.g., about 400 to about 700 nanometers) are used as the propagating light.

Figure 9:
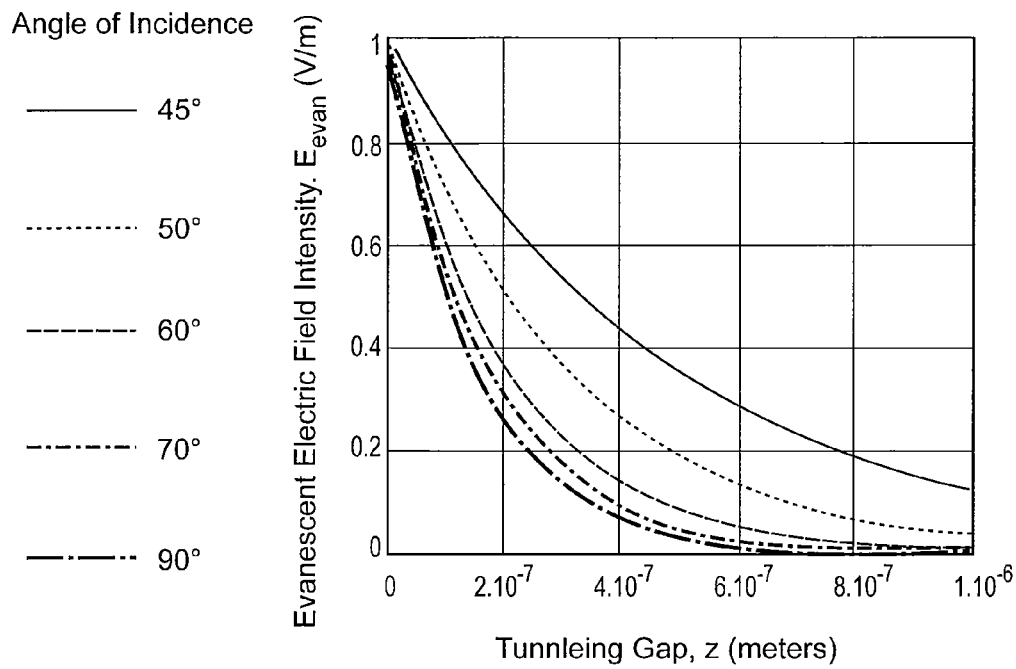
FIG. 9 is a linear plot of an evanescent field intensity as a function of the tunneling gap for several angles of incidence.
Figure 10:
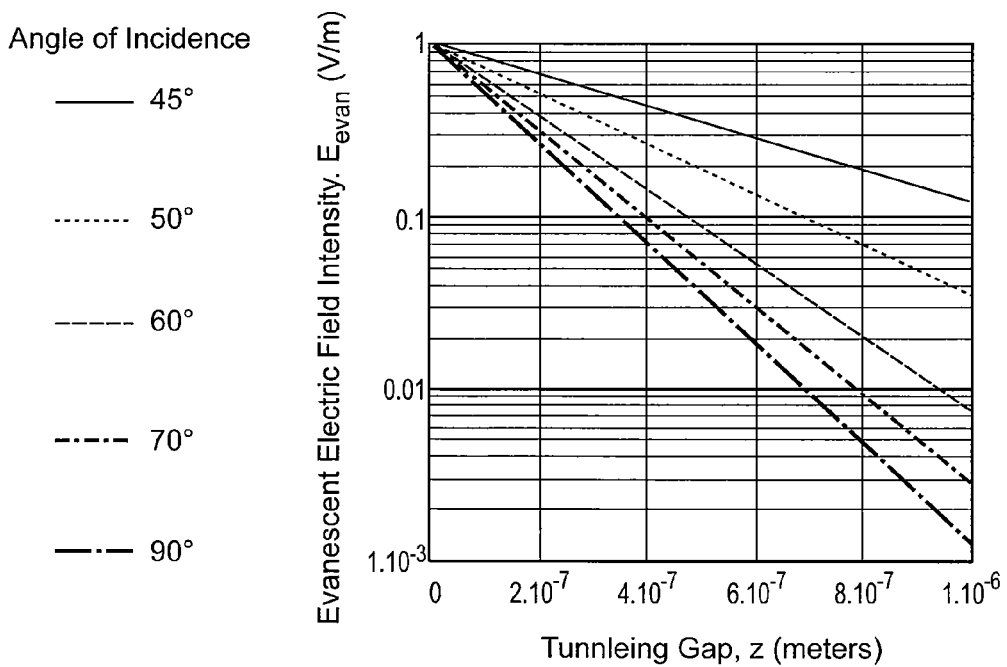
FIG. 10 is a log/linear scale plot of an evanescent field intensity as a function of the tunneling gap for several angles of incidence.

The evanescent electric field as a function of the tunneling gap is plotted on a linear scale in FIG. 9 and a log/linear scale in FIG. 10 for several incident light beam angles ranging from approximately 45 degrees to approximately 90 degrees. The critical angle for the transparent substrate modeled in FIGS. 9 and 10 is approximately 42 degrees. These plots illustrate that the electric field of the evanescent wave is still significant for tunneling gaps of about 1 micron or more (e.g., $\lambda_1$=approximately 500 nanometers).

If a third medium with a refractive index that is greater than the refractive index of the second medium (e.g., $\eta_3 > \eta_2$) is brought close to medium 1 (see e.g. FIGS. 7*b* and 7*c*) such that the evanescent field penetrates the interface between medium 2 and medium 3, then light will tunnel into medium 3 and create a propagating light beam in medium 3. The dependence of the tunneling photon flux on the tunneling gap and ratios of the refractive indices will be the same as that shown in FIGS. 9 and 10. The transmittance of the propagating light beam is dependent on the distance between the two interfaces and becomes unity as $d_p$ approaches zero.

FIGS. 9 and 10 illustrate that the signal dynamic range, the spatial measurement range, and the signal spatial dependence over a measurement range are dependent on the angle of incidence of the light source that propagates light though the transparent substrate and the differences in the refractive indices of the media. FIGS. 9 and 10 suggest that for a flat bimorph structure with a light source operating close to the critical angle, the dynamic range for an imaging pixel may be in the range of approximately 300 nanometers to approximately 1000 nanometers. Where imaging pixels are configured such that the bimorph structures are positioned near the center of the imaging pixels (e.g. FIG. 4) the center of the imaging pixel may enter the evanescent field before the edges, thus there may be a larger change in the tunneling signal (and thus dynamic range) by a factor of approximately 3 to approximately 5 than that indicated by FIGS. 9 and 10.

While the variable waveband imager is described in the context of the configurations illustrated in FIGS. 2A-B and 3-6, the variable waveband imager includes added versatility in that it may quickly and easily be adjusted to optimize its performance. Adjustment of the intensity of the light source provides the ability to fine tune the intensity of the converted visible radiation (e.g., the superimposed infrared image) during different usage times, such as daylight, dusk, or nighttime.

Additionally, if desired, the infrared imaging may be disabled by turning off the light source such that visible light is not propagated through the substrate. Further versatility is provided in that adjustments to the sensitivity of the variable waveband imager may be implemented by varying the angle of incidence of the light source. Varying this angle will affect the penetration distance of the evanescent electric field into the vacuum gap and vary the amount of light that is capable of tunneling through to the bimorph structure and plate material. Yet further versatility may be provided by utilizing a cooling device in conjunction with the variable waveband imager to adjust the temperature of the variable waveband imager compared to its surrounding temperature. Varying the temperature of the variable waveband imager permits a user to control the amount that the bimorph structure may bend towards the substrate and therefore control the intensity of the light that is capable of tunneling through to the bimorph structure and plate material.

An alternative of the variable waveband imager may include a substrate material that absorbs visible wavelengths. This configuration of a variable waveband imager may operate in a similar manner except that only infrared radiation is passed through the substrate to the bimorph structure and absorbing plate material. This configuration of a variable waveband imaging device may be used to convert infrared radiation from a scene into a visible radiation. This converted visible radiation may be focused to an observer through an imaging device. Alternatively, the converted visible radiation may be imaged with a camera and displayed on a display device or recorded on a medium for later playback or viewing. In some variable waveband imagers of this design, the substrate material may be silicon or germanium.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:
1. A waveband imager, comprising:
 a substrate, the substrate being transparent to infrared radiation;
 a bimorph structure anchored to and spaced apart from the substrate by a post to form a gap between the substrate, the bimorph structure comprising an upper layer of material and a lower layer of material, each of which has a different coefficient of thermal expansion;
 a light source that introduces a propagating visible wavelength into a thickness of the substrate, the propagating visible wavelength angled to generate an evanescent electric field in the gap;
 where the bimorph structure is configured to absorb infrared radiation and the bimorph structure is further configured to deflect towards the substrate such that the bimorph structure enters the evanescent electric field and a portion of the propagating visible wavelength in the thickness of the substrate tunnels through the gap and is transmitted through the bimorph structure as a converted visible radiation.

2. The waveband imager of claim 1, where the substrate is transparent to visible wavelengths of light.

3. The waveband imager of claim 2, where the bimorph structure comprises a corrugated surface.

4. The waveband imager of claim 2, where an intensity of the converted visible radiation is proportional to an intensity of infrared radiation incident on the transparent substrate.

5. The waveband imager of claim 2, where the upper layer of material of the bimorph structure comprises a silicon dioxide thin film.

6. The waveband imager of claim 2, where the lower layer of material of the bimorph structure comprises a polymer.

7. The waveband imager of claim 2, where the upper layer of material of the bimorph structure has a lower coefficient of thermal expansion than the lower layer material of the bimorph structure.

8. The waveband imager of claim 2, where the post comprises a low thermal conductivity material.

9. The waveband imager of claim 8, where the low thermal conductivity material comprises a silicon dioxide aerogel.

10. The waveband imager of claim 2, where the light source is oriented to introduce the propagating visible wavelength into the thickness of the substrate at an angle of incidence that is approximately larger than the critical angle of the substrate.

11. The waveband imager of claim 2, where the bimorph structure further comprises a stiffening trench at an end distal from the post.

12. The waveband imager of claim 2, further comprising a light blocking layer positioned between the substrate and a base of the post.

13. The waveband imager of claim 2, where the upper layer of material and the lower layer of material comprise dielectric materials.

14. The waveband imager of claim 13, where the dielectric materials comprise low thermal conductive materials.

15. The waveband imager of claim 2, further comprising a diffuser plate between the light source and the substrate.

16. A dual waveband imager, comprising:
a transparent substrate transparent to visible wavelengths of light and infrared radiation;
a pixel plate spaced apart from the transparent substrate by a first post and a second post; and
a bimorph structure formed in a portion of the pixel plate, where the bimorph structure is transparent to visible wavelengths of light and absorbs infrared radiation.

17. The dual waveband imager of claim 16, where the first post and the second post are positioned at opposite corners of the pixel plate and extend downwards to the transparent substrate.

18. The dual waveband imager of claim 17, where the pixel plate further comprises stiffening trenches.

19. The dual waveband imager of claim 16, where the first post and the second post are positioned opposite one another on opposing sides of the pixel plate and extend downwards to the transparent substrate.

20. The dual waveband imager of claim 19, further comprising a first bimorph structure extending from the first post toward a center of the pixel plate, and a second bimorph structure extending from the second post toward the center of the pixel plate, and where the first bimorph structure and the second bimorph structure are joined together through stiffening trenches at the center of the pixel plate.

21. The dual waveband imager of claim 20, where the pixel plate comprises a dielectric material having a first coefficient of thermal expansion.

22. The dual waveband imager of claim 21, where the first bimorph structure comprises a second dielectric material affixed to an underside of the pixel plate, and where the second dielectric material comprises a second coefficient of thermal expansion, where the first coefficient of thermal expansion and the second coefficient of thermal expansion are different.

23. A method of generating a visible image with a single dual waveband imager, comprising:
receiving a visible wavelength on a transparent substrate having a thickness;
passing the visible wavelength through the transparent substrate and through a bimorph structure formed with a portion of a pixel plate spaced apart from the transparent substrate;
introducing a propagating visible wavelength into the thickness of the transparent substrate at an angle that generates an evanescent electric field between the transparent substrate and the bimorph structure;
receiving an infrared radiation on the transparent substrate;
passing the infrared radiation through the transparent substrate to the bimorph structure;
absorbing the infrared radiation with the bimorph structure and generating heat;
deforming the bimorph structure and the pixel plate towards the transparent substrate in response to the generated heat; and
tunneling a portion of the propagating visible wavelength out of the transparent substrate and through the bimorph structure and pixel plate where it is viewable as a converted visible radiation.

24. The method of claim 23, where varying a distance that the bimorph structure is spaced apart from the transparent substrate varies an intensity of the converted radiation.

25. The method of claim 23, where the propagating visible wavelength is introduced into the thickness of the transparent substrate at an incident angle that is approximately greater than a critical angle of the transparent substrate.

26. The method of claim 23, where an intensity of the converted visible radiation is controllable by an intensity of the propagating visible wavelength introduced into the thickness of the transparent substrate.

* * * * *